United States Patent
Amit et al.

(10) Patent No.: US 8,931,102 B2
(45) Date of Patent: Jan. 6, 2015

(54) TESTING WEB APPLICATIONS FOR FILE UPLOAD VULNERABILITIES

(75) Inventors: Yair Amit, Herzliya (IL); Roee Hay, Herzliya (IL); Roi Saltzman, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/150,735

(22) Filed: Jun. 1, 2011

(65) Prior Publication Data

US 2012/0311712 A1 Dec. 6, 2012

(51) Int. Cl.
| | |
|---|---|
| *G06F 21/00* | (2013.01) |
| *H04L 29/06* | (2006.01) |
| *G06F 21/57* | (2013.01) |
| *H04L 17/00* | (2006.01) |
| *G06F 7/04* | (2006.01) |
| *G06F 11/00* | (2006.01) |
| *H04L 9/32* | (2006.01) |

(52) U.S. Cl.
CPC .......... *H04L 63/1433* (2013.01); *G06F 21/577* (2013.01)
USPC ........ 726/25; 726/1; 726/22; 726/26; 726/27; 726/30; 713/176

(58) Field of Classification Search
CPC .............. H04L 9/3247; H04L 63/0227; H04L 63/1433; G06H 21/577; G06H 21/60; G06H 21/56
USPC ........................ 713/176; 726/1, 22, 25–27, 30
See application file for complete search history.

(56) References Cited

U.S. PATENT DOCUMENTS

| | | | |
|---|---|---|---|
| 7,424,706 B2 * | 9/2008 | Ivanov et al. | 717/169 |
| 7,712,137 B2 | 5/2010 | Meier | |

(Continued)

FOREIGN PATENT DOCUMENTS

| | | |
|---|---|---|
| EP | 1533373 A1 | 5/2005 |
| JP | 2004-000018 A | 1/2004 |

(Continued)

OTHER PUBLICATIONS

Pie, et al "Automating integration testing of larger-sacle publish/subcribe systems", In: Hinze, A., Buchmann, A.P. (eds.) Principles and Applications of Distributed Event-Based Systems, 2010, IGI Gobal, pp. 140-163.*

(Continued)

*Primary Examiner* — Michael Chao
*Assistant Examiner* — Shiuh-Huei Ku
(74) *Attorney, Agent, or Firm* — Holland & Knight LLP; Brian J. Colandreo, Esq.; Jeffrey T. Placker, Esq.

(57) ABSTRACT

A system for detecting file upload vulnerabilities in web applications is provided. The system may include a black-box tester configured to upload, via a file upload interface exposed by a web application, a file together with a signature associated with the file. An execution monitor may be configured to receive information provided by instrumentation instructions within the web application during the execution of the web application. The execution monitor may be configured to recognize the signature of the uploaded file as indicating that the uploaded file was uploaded by the black-box tester. The execution monitor may also be configured to use any of the information to make at least one predefined determination assessing the vulnerability of the web application to a file upload exploit.

15 Claims, 3 Drawing Sheets

(56) References Cited

U.S. PATENT DOCUMENTS

| | | | |
|---|---|---|---|
| 7,895,651 B2* | 2/2011 | Brennan | 726/22 |
| 8,272,058 B2* | 9/2012 | Brennan | 726/24 |
| 2003/0233331 A1* | 12/2003 | Laudenbach et al. | 705/64 |
| 2006/0005087 A1* | 1/2006 | Ristau et al. | 714/716 |
| 2007/0156644 A1 | 7/2007 | Johnson et al. | |
| 2008/0263358 A1 | 10/2008 | Alme | |
| 2008/0295178 A1 | 11/2008 | Beresniewicz | |
| 2009/0287653 A1* | 11/2009 | Bennett | 707/3 |
| 2011/0179119 A1* | 7/2011 | Penn | 709/205 |
| 2011/0231936 A1 | 9/2011 | Williams et al. | |
| 2012/0192275 A1* | 7/2012 | Oliver et al. | 726/24 |
| 2012/0257249 A1* | 10/2012 | Natarajan | 358/1.15 |
| 2012/0260096 A1 | 10/2012 | Balinsky et al. | |
| 2012/0291030 A1* | 11/2012 | Fitzgerald et al. | 718/1 |
| 2012/0317174 A1* | 12/2012 | Miller | 709/203 |

FOREIGN PATENT DOCUMENTS

| | | |
|---|---|---|
| JP | 2004-035600 A | 2/2004 |
| KR | 20120006789 A | 1/2012 |
| WO | 03067405 A2 | 8/2003 |
| WO | 03097830 A1 | 11/2003 |

OTHER PUBLICATIONS

Bau et al. "State of the art: automated black-box web application vulnerability testing", May 16-19, 2010, Proceeding s of the 2010 IEEE Symposium on Security and Privacy, IEEE Computer Society Washington, DC, pp. 332-345.*

Alalfi et al., Automated Reverse Engineering of UML Sequence Diagrams for Dynamic Web Applications, IEEE International Conference of Software Testing Verification and Validation Workshops, Feb. 2009, pp. 287-294.

Bezroutchko, "Scanit the Security Company," Secure File Upload in PHP Web Applications, Jun. 13, 2007, pp. 1-20.

Office Action Dated Oct. 5, 2012, EP Application No. 10 2012 209 006.1, pp. 1-7 (For reference only).

Bezroutchko, "Secure File Upload in PHP Web Applications," Jun. 2007, pp. 1-20.

Silic, "Security Vulnerabilities in Modern Web Browser Architecture," downloaded May 24, 2011, pp. 1-6.

Sun et al., "Classification of SQL Injection Attacks," Electrical and Computer Engineering, University of British Columbia, Nov. 17, 2007, pp. 1-6.

Sun et al., "Retrofitting Existing Web Applications with Effective Dynamic Protection Against SQL Injection Attacks," 2005, pp. 1-21.

Popa, "Detection of the Security Vulnerabilities in Web Applications," Informatica Economica, vol. 13, No. 1/2009, pp. 127-136.

Suhina, "Exploiting and Automated Detection of Vulnerabilities," Zagreb, 2007, pp. 1-29.

Combined Search and Examination Report, received in counterpart GB1206115.6, dated Jul. 12, 2012, pp. 1-7.

* cited by examiner

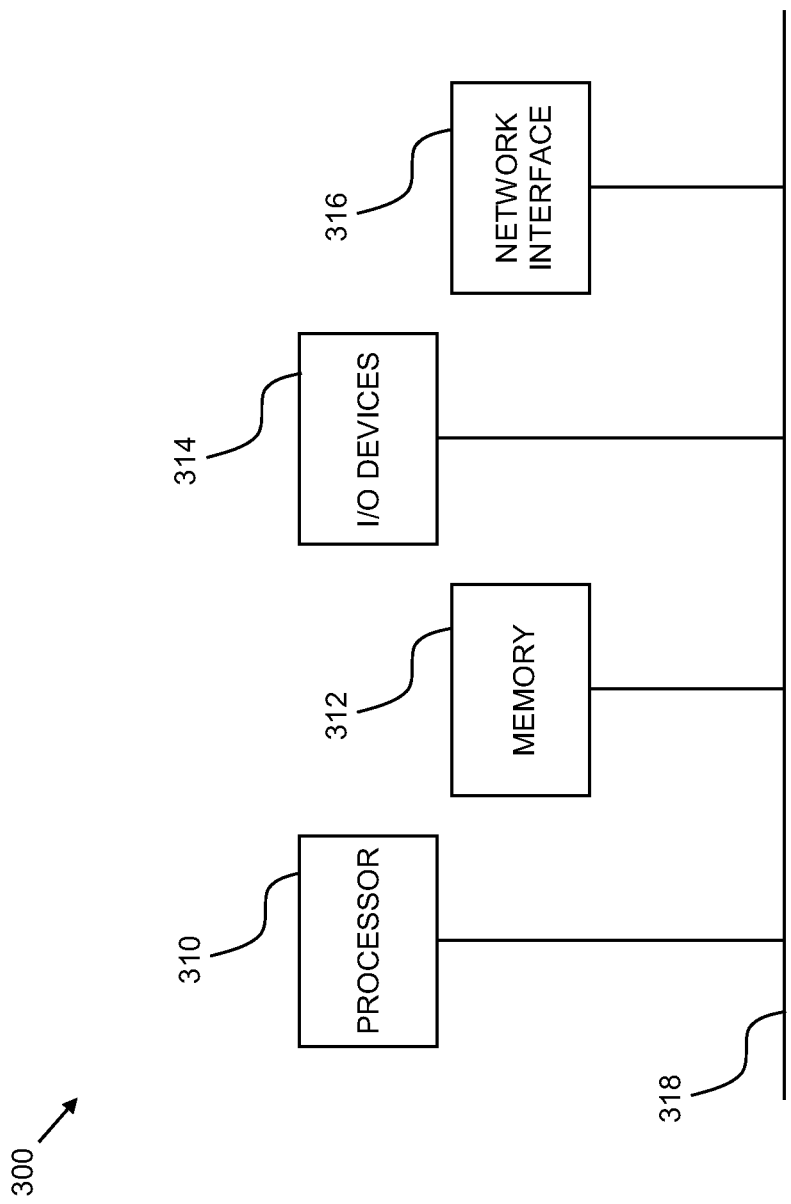

TESTING WEB APPLICATIONS FOR FILE UPLOAD VULNERABILITIES

BACKGROUND OF THE INVENTION

The invention relates to computer software analysis and testing in general. Internet-based web applications often may allow users to upload computer files to the web application host computer in ways that may expose the host computer to malicious attacks. For example, a web application may store uploaded files in a web-accessible directory where no security constraints are applied. This may allow an attacker to upload a file having an extension, such as .ASPX, .PHP, or .JSP, that may be mapped to the server-side scripting engine. When the attacker accesses the uploaded file, it may be executed by the scripting engine, allowing the attacker to execute malicious code on the server.

BRIEF SUMMARY OF THE INVENTION

In one aspect of the invention a system is provided for detecting file upload vulnerabilities in web applications. The system may include a black-box tester which may be configured to upload, via a file upload interface exposed by a web application, a file together with a signature associated with the file. An execution monitor may be configured to receive information provided by instrumentation instructions within the web application during the execution of the web application. The execution monitor may be configured to recognize the signature of the uploaded file as indicating that the uploaded file was uploaded by the black-box tester. The execution monitor may also be configured to use any of the information to make at least one predefined determination assessing the vulnerability of the web application to a file upload exploit.

A method and computer-program product embodying the invention are also provided.

BRIEF DESCRIPTION OF THE SEVERAL VIEWS OF THE DRAWINGS

The invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION OF THE INVENTION

Figure 1:
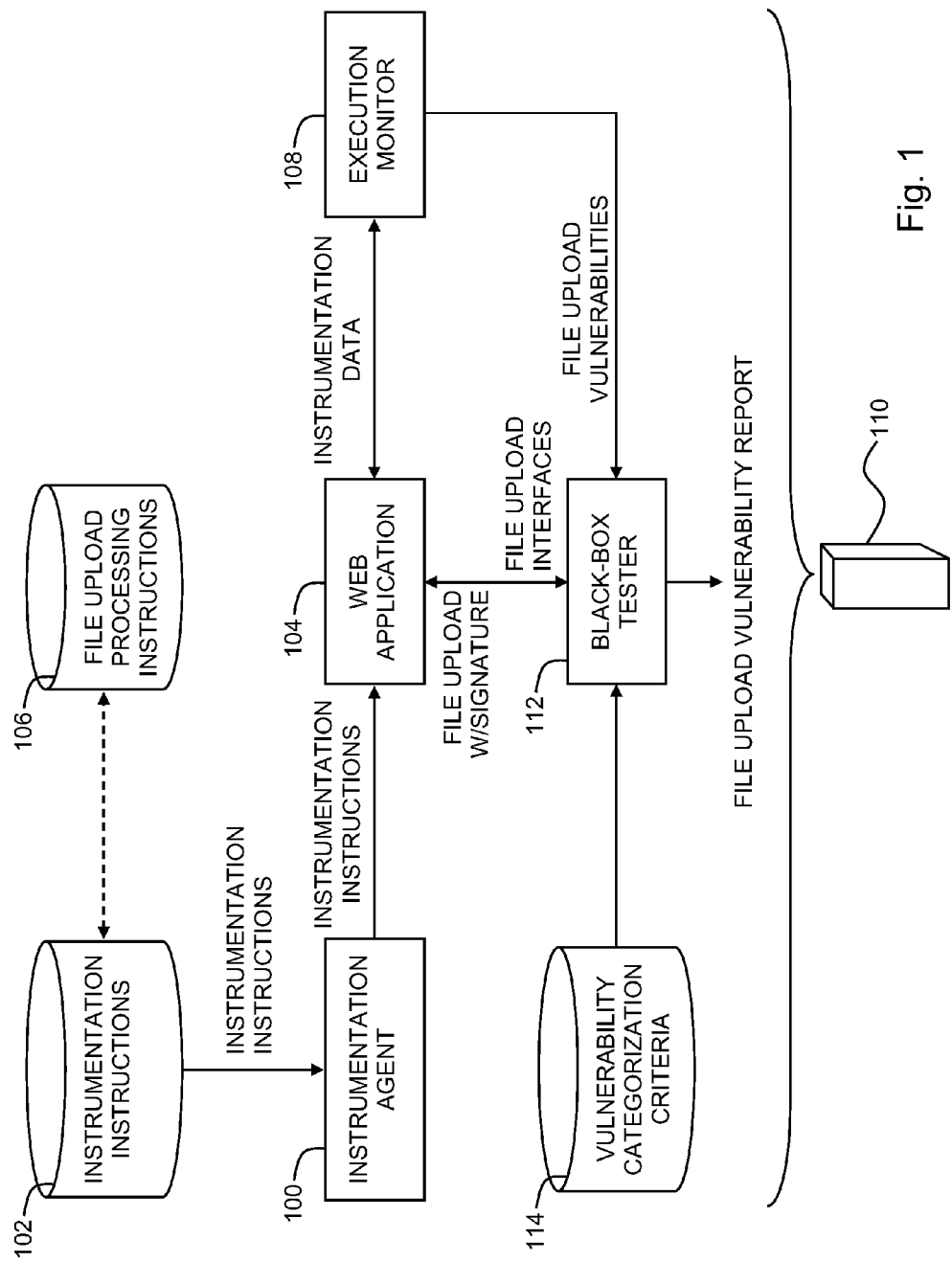
FIG. 1 is a simplified conceptual illustration of a system for detecting file upload vulnerabilities in web applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for detecting file upload vulnerabilities in web applications, constructed and operative in accordance with an embodiment of the invention. In the system of FIG. 1 an instrumentation agent 100 may be configured to insert instrumentation instructions 102 into one or more locations among the instructions of a web application 104, such as into the source code or byte code of web application 104, where web application 104 may be, for example, implemented using JAVA™, PHP™, or ASP.NET™. Instrumentation instructions 102 may be predefined to provide specific information about web application 104 during its execution that may be used to detect file upload vulnerabilities in web application 104, as will be described in greater detail hereinbelow. Instrumentation instructions 102 may also be associated in advance with a predefined set of instructions 106 known to be involved in processing file upload requests, and may be inserted into the instructions of web application 104 such that they are triggered when such associated instructions 106 are executed within web application 104. Thus, for example, instrumentation instructions 102 may include the instruction 'File.getAbsolutePath( )' for providing path information of an uploaded file, where 'File.getAbsolutePath( )' may be associated with the instruction 'FileOutputStream.write' in instructions 106 that may be known to be involved in writing uploaded files to a data storage device. An execution monitor 108 may be configured to receive information provided by the instrumentation instructions within web application 104 during its execution, and may also be configured to gather information from the execution environment of web application 104, such as from a server 110 that hosts web application 104 and execution monitor 108 as well. Execution monitor 108 may thus be an executable entity that may be separate from the instrumentation instructions within web application 104, or may be embodied within the instrumentation instructions themselves within web application 104. A black-box tester 112, such as IBM Rational AppScan™, commercially-available from International Business Machines Corporation, Armonk, N.Y., may be configured to examine web application 104 during its execution in accordance with conventional black-box testing techniques to identify file upload interfaces exposed by web application 104. Black-box tester 112, which may also be hosted by server 110, may also be configured to attempt to upload files via the identified file upload interfaces, where black-box tester 112 may include in the name, body, and/or metadata of an uploaded file a signature that may be recognized by execution monitor 108 as indicating that the file was uploaded by black-box tester 112.

When black-box tester 112 uploads a file via a file upload interface of web application 104, execution monitor 108 may identify the uploaded file by its signature and may make one or more determinations, using information provided by the instrumentation instructions within web application 104 during its execution and/or information from the execution environment of web application 104, to assess the vulnerability of web application 104 to file upload exploits. For example, one or more of the following determinations may be made.

A determination of whether or not the uploaded file is stored by web application 104 in a web-accessible location may be made. In order to make this determination, the path where the uploaded file is stored and the web root path may be provided by the instrumentation instructions within web application 104 during its execution, and/or gathered from the execution environment of web application 104. The uploaded file may be in a web-accessible location if it lies within the web root path.

A determination of whether or not the uploaded file can be executed by a scripting engine that has access to the uploaded file may be made. In order to make this determination, the uploaded file privileges, its file extension, and the mapping of file extensions to scripting engines as defined by the server configuration may be provided by the instrumentation instructions within web application 104 during its execution, and/or gathered from the execution environment of web application 104. The uploaded file may be executed by a scripting engine if it is executable and has a file name suffix that is known to be handled by a scripting engine.

A determination of whether or not the path where the uploaded file is stored by web application 104 is predictable in accordance with predefined predictability criteria may be made. In order to make this determination, a sample of the paths where uploaded files are stored may be provided by the instrumentation instructions within web application 104 during its execution, and/or gathered from the execution environment of web application 104. The sample paths may be analyzed statistically using conventional techniques in order to assess their effective distribution, such as by computing their entropy.

A determination of whether or not the path where the uploaded file is stored by web application 104 is fully controllable by the user may be made. In order to make this determination, the path where the uploaded file is stored may be provided by the instrumentation instructions within web application 104 during its execution, and/or gathered from the execution environment of web application 104. The path of the uploaded file may be fully controllable by the user if the path indicated by black-box tester 112 during the file upload matches the path where the uploaded file is stored.

A determination of whether or not the uploaded file includes certain control characters that may cause the web application host to render the uploaded file may be made. In order to make this determination, the uploaded file itself may be examined, such as by using static analysis techniques, to determine if the uploaded file includes one or more predefined control characters in one or more predefined locations within the uploaded file that are known to be associated with file upload exploits. For example, if the target is a PHP engine, the uploaded file could contain PHP code such as <?php echo "some signature" ?>. Thus, the uploaded file may be analyzed in order to determine if it contains the 'echo "some signature"' code.

A determination of whether or not the uploaded file is stored by web application 104 in a predefined sensitive location, such as the root directory of server 110 may be made.

A determination of whether or not the uploaded file is stored by web application 104 with its original name may be made. This may indicate a vulnerability as it may allow an attacker to upload a file including executable code and then execute the file by calling it, since he knows the name of the uploaded file as stored.

A determination of whether or not the uploaded file is stored by web application 104 with its original suffix that is a predefined sensitive suffix, such as '.jsp', that may cause the web application host to render the file may be made.

The results of any of the above determinations may be provided to black-box tester 112 together with the signature of the uploaded file and/or the name the of uploaded file. Black-box tester 112 may categorize any security vulnerabilities indicated by the results of any of the above determinations in terms of severity and exploitability in accordance with predefined categorization criteria 114. For example, if the uploaded file is executable, its path may be predictable, and control data can be inserted into it, then it may be categorized as a vulnerability of high severity. Alternatively, if the uploaded file is non executable, or its path is unpredictable, or control data cannot be inserted into it, then it may be categorized as a vulnerability of low severity. Black-box tester 112 may provide a report on the file upload vulnerabilities of web application 104, including the results of any of the above determinations and/or the categorization information, such as to an operator of black-box tester 112.

Black-box tester 112 may also automatically generate and perform file upload exploits based on the results of any of the above determinations and/or the categorization information. For example, by understanding which control data can be inserted to an uploaded file, a correct exploit may be made into which such control data is inserted. Likewise, by receiving insight regarding the path where the uploaded file is stored, black-box tester 112 may compute the uploaded file's URL in order to create an exploit such as a "one-click" exploit. Thus, if the root URL of the application is http://domain/root/app/, and the absolute path of the application's web root is /var/www, and the absolute file path of the uploaded file is /var/www/foo/bar/predictable.jsp, then the black-box tester 112 may determine that the uploaded file is accessible via http://domain/root/app/foo/bar/predictable.jsp and may create an exploit using this information.

Figure 2:
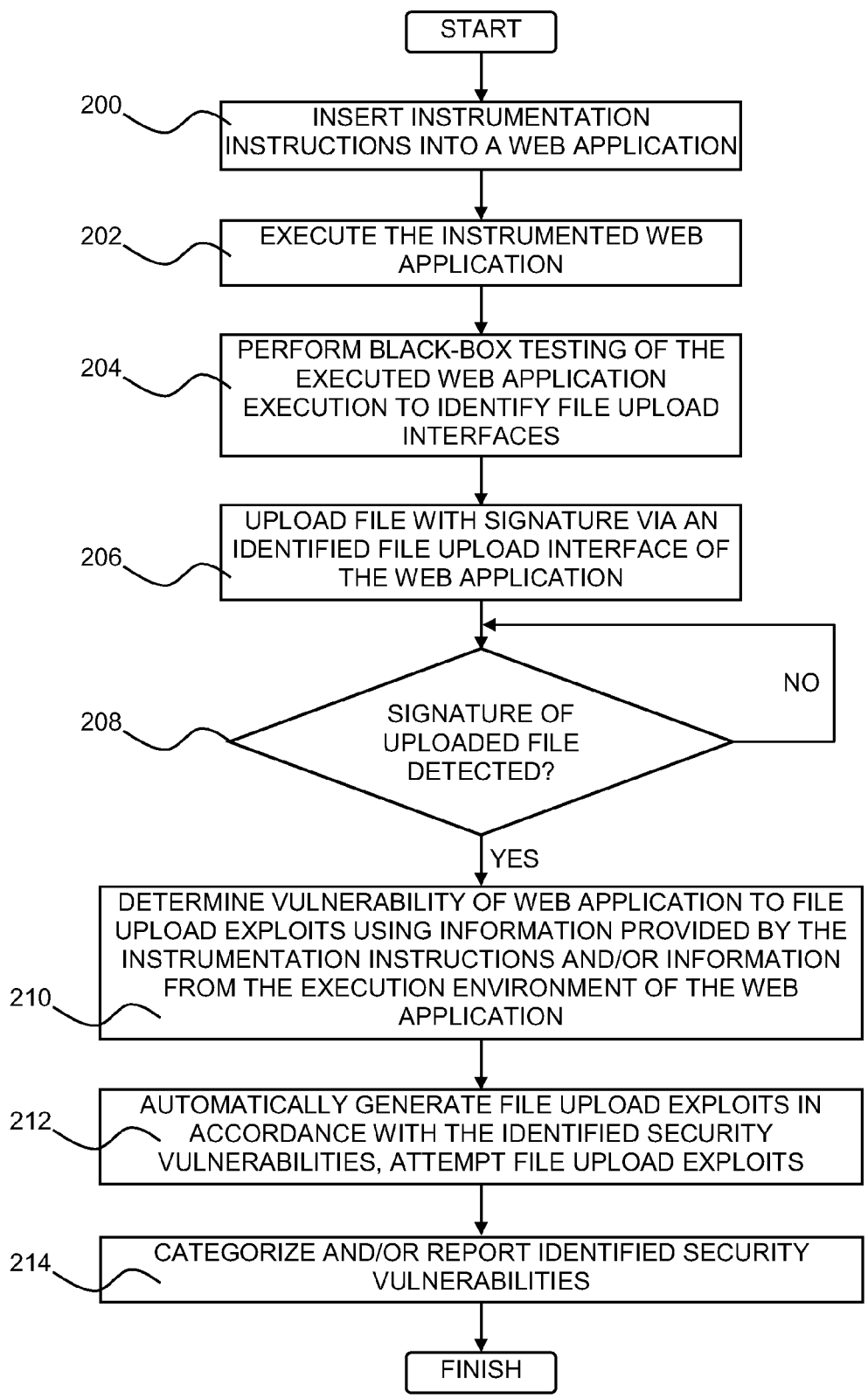
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, instrumentation instructions may be inserted into one or more locations among the instructions of a web application (operation 200), where the instrumentation instructions may be predefined to provide specific information about the web application during its execution that may be used to detect file upload vulnerabilities in the web application 104. The instrumented web application may then be executed (operation 202). Black-box testing of the instrumented web application may be performed during its execution to identify file upload interfaces exposed by the web application (operation 204). A file may be uploaded via a file upload interface of the web application, where the file may include a signature that may be recognized by that monitors the instrumented web application during its execution (operation 206). When an uploaded file bearing the signature is detected by the instrumentation instructions and/or by the execution monitor (operation 208), one or more determinations may be made, using information that may be provided by the instrumentation instructions within the web application during its execution and/or information from the execution environment of the web application 104, to assess the vulnerability of web application to file upload exploits (operation 210). Identified security vulnerabilities may be categorized and/or reported (operation 212), and file upload exploits may be automatically generated in accordance with the identified security vulnerabilities and attempted (operation 214).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein may include any processing device, such as, for example, one that may include a CPU (central processing unit) and/or other processing circuitry. It is also to be understood that the term "processor" may refer to more than one processing device and that various elements associated with a processing device may be shared by other processing devices.

The term "memory" as used herein may include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein may include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computing system for detecting file upload vulnerabilities in web applications comprising:
   at least one processor;
   at least one memory architecture coupled with the at least one processor, the at least one processor configured for:
   automatically uploading, via a file upload interface exposed by a web application, a file together with a signature associated with the file, wherein a black box tester automatically examines the web application during execution of the web application to identify the file upload interface exposed by the web application and automatically uploads the file via the file upload interface;
   receiving, via an execution monitor, information provided by instrumentation instructions within the web application during the execution of the web application;
   wherein the execution monitor recognizes the signature of the uploaded file as identifying the black-box tester as the origin of the uploaded the file, wherein the signature includes a name of the uploaded file;
   wherein the execution monitor uses any of the information, including the signature, to make at least one predefined determination assessing the vulnerability of the web application to a file upload exploit; and
   wherein the at least one predefined determination includes using a static analysis to determine if the uploaded file includes one or more predefined control characters associated with vulnerabilities.

2. The computing system of claim 1 and further comprising inserting, via an instrumentation agent, the instrumentation instructions among the instructions of the web application.

3. The computing system of claim 1 wherein the execution monitor gathers information from an execution environment of the web application.

4. The computing system of claim 3 wherein the execution environment is a server that hosts the web application.

5. The computing system of claim 4 wherein the server hosts the execution monitor.

6. The computing system of claim 4 wherein the server hosts the black-box tester.

7. The computing system of claim 1 wherein the black-box tester automatically generates and perform a file upload exploit based on the determination.

8. The computing system of claim 1 wherein the execution monitor is embodied within the instrumentation instructions.

9. The computing system of claim 1 wherein any of the instrumentation instructions are triggered when an instruction known to be involved in processing file upload requests is executed within the web application.

10. The computing system of claim 1 wherein the signature is included in any of the name, body, and metadata of the uploaded file.

11. The computing system of claim 1 wherein the determination is any of
   whether the uploaded file is stored by the web application in a web-accessible location,
   whether the uploaded file can be executed by a scripting engine that has access to the uploaded file,
   whether the path where the uploaded file is stored by the web application is predictable in accordance with predefined predictability criteria,
   whether the path where the uploaded file is stored by the web application is fully controllable by the user,
   whether the uploaded file includes control characters that are known to cause a host of the web application to render the uploaded file,
   whether the uploaded file is stored by the web application in a predefined sensitive location,
   whether the uploaded file is stored by the web application with its original name as provided by the black-box tester, and
   whether the uploaded file is stored by the web application with a predefined sensitive suffix that is known to cause a host of the web application to render the file.

12. A computer program product for detecting file upload vulnerabilities in web applications, the computer program product comprising:
   a non-transitory computer-readable storage medium; and
   computer-readable program code embodied in the non-transitory computer-readable storage medium, wherein the computer-readable program code is configured to
   automatically upload, via a file upload interface exposed by a web application, a file together with a signature associated with the file, wherein the signature includes a name of the file, wherein the computer-readable program code automatically examines the web application during execution of the web application to identify the file upload interface exposed by the web application and automatically uploads the file via the file upload interface, and
   responsive to recognizing the signature identifying a black-box tester as the origin of the uploaded file,
      receive information provided by instrumentation instructions within a web application during the execution of the web application, and
      use any of the information, including the signature, to make at least one predefined determination assessing the vulnerability of the web application to a file upload exploit;
   wherein the at least one predefined determination includes using a static analysis to determine if the uploaded file includes one or more predefined control characters associated with vulnerabilities.

13. The computer program product of claim 12 wherein the computer-readable program code is configured to insert the instrumentation instructions among the instructions of the web application.

14. The computer program product of claim 13 wherein the computer-readable program code is configured to insert the instrumentation instructions such that the instrumentation instructions are triggered when an instruction known to be involved in processing file upload requests is executed within the web application.

15. The computer program product of claim 12 and further comprising automatically generating and performing a file upload exploit based on the determination.

* * * * *